United States Patent [19]

Taylor et al.

[11] Patent Number: 4,666,189
[45] Date of Patent: May 19, 1987

[54] PREFABRICATED MULTI-WALL CHIMNEY

[75] Inventors: Roger W. Taylor; Arthur R. Templin, both of Greensboro, N.C.

[73] Assignee: Masco Corporation, Taylor, Mich.

[21] Appl. No.: 491,995

[22] Filed: May 5, 1983

[51] Int. Cl.[4] ............................................. F16L 39/00
[52] U.S. Cl. .................................... 285/47; 285/133.1; 285/138; 126/307 R; 110/184; 98/60
[58] Field of Search ..................... 285/47, 133 R, 187, 285/224, 225, 411, 138; 98/60; 110/184; 126/307 R, 121, 315, 318

[56] References Cited

U.S. PATENT DOCUMENTS

| | | | |
|---|---|---|---|
| 5,651 | 6/1848 | West et al. | 285/371 X |
| 1,812,678 | 6/1931 | Bernert | 285/406 |
| 1,819,086 | 8/1931 | Friend | 285/407 |
| 2,014,666 | 9/1935 | Peik | 285/133 R |
| 2,178,819 | 11/1939 | Timm | 285/411 |
| 2,331,932 | 10/1943 | Rowand | 285/187 X |
| 2,362,557 | 1/1944 | Jahns | 285/22 |
| 2,404,530 | 7/1946 | Resek | 110/184 X |
| 2,451,587 | 10/1948 | Taylor | 285/111 |
| 2,613,166 | 10/1952 | Gronemeyer | 138/148 |
| 2,650,112 | 8/1953 | Kinkead | 285/22 |
| 2,718,841 | 9/1955 | Kinkead | 98/46 |
| 2,761,949 | 9/1956 | Colton | 219/38 |
| 2,841,419 | 7/1958 | Jay | 285/225 |
| 2,851,288 | 9/1958 | Kinkead | 285/133 |
| 2,930,407 | 3/1950 | Conley et al. | 138/64 |
| 3,146,005 | 8/1964 | Peyton | 285/47 |
| 3,170,544 | 2/1965 | Kinkead et al. | 289/27 |
| 3,272,537 | 9/1966 | Stone et al. | 285/187 |
| 3,371,946 | 3/1968 | Bleyle Jr. et al. | 285/47 |
| 3,543,670 | 12/1970 | Stone | 285/419 |
| 3,574,357 | 4/1971 | Alexandru et al. | 285/47 |
| 3,765,707 | 10/1973 | Westberg | 285/407 |
| 3,842,721 | 10/1974 | Cardiff | 285/133 R X |
| 3,872,780 | 3/1975 | Zanias | 126/307 R X |
| 3,902,744 | 9/1975 | Stone | 285/47 |
| 4,029,343 | 6/1977 | Stone | 285/47 |
| 4,029,344 | 6/1977 | Stone | 285/47 |
| 4,363,504 | 12/1982 | De Feo et al. | 285/187 |
| 4,479,602 | 10/1984 | Fernandez et al. | 285/138 |

Primary Examiner—Cornelius J. Husar
Assistant Examiner—Eric K. Nicholson
Attorney, Agent, or Firm—Leon E. Redman; Malcolm L. Sutherland; Steven L. Permut

[57] ABSTRACT

The invention as shown herein demonstrates a prefabricated chimney which can be manufactured in sections of convenient length for handling and shipped to construction sites for venting boilers or the like. The chimney sections are of the multi-wall design whereby the inner tube conducts hot exhaust gases from a fuel-burning chamber to the outside. Tubes which are concentric or coaxial with the inner tubes insulate the building or other structural members from contacting the hot inner tube and insulating layer of air or otherwise retards the heat flow from the inner tube. The inner tubes of the sections are joined by a containment band which tightly engages the end flange of the inner tubes which may have rectangularly-shaped cross-sections.

17 Claims, 8 Drawing Figures

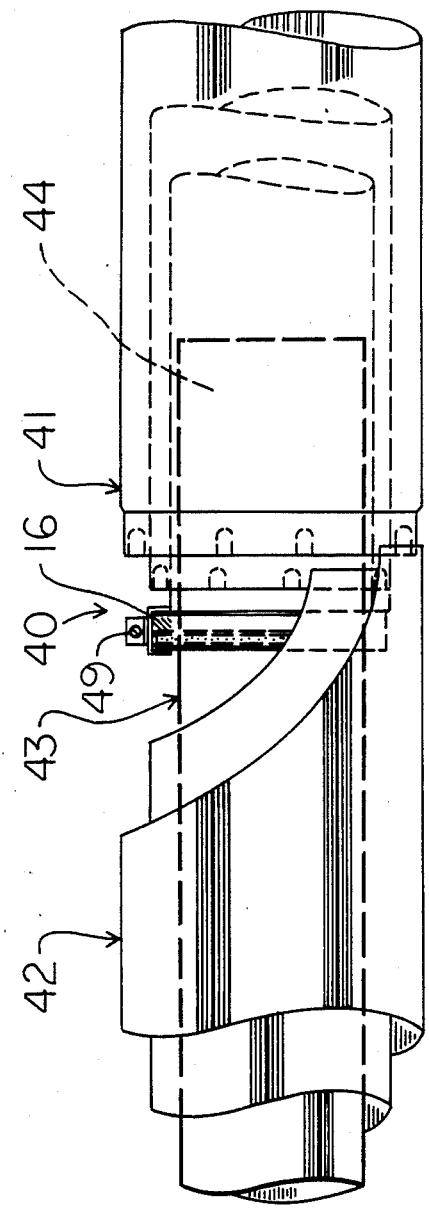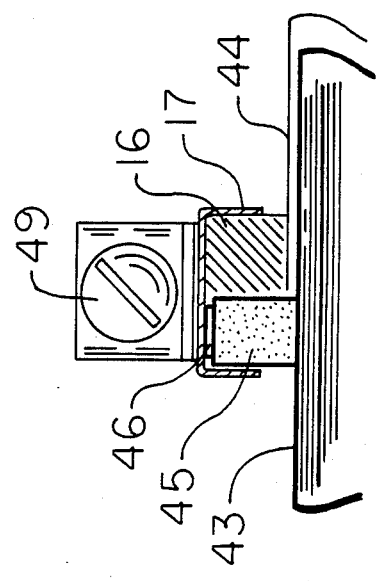

PREFABRICATED MULTI-WALL CHIMNEY

BACKGROUND AND OBJECTIVES OF THE INVENTION

Exhaust chimneys for furnaces, boilers or the like have been generally constructed on-site to accomodate the particular building or location. Later, it has been found that chimneys constructed from prefabricated sections are adaptable to most building or remodeling projects. However, it has been found that while prefabricated chimney sections work well under certain load conditions, these same sections fail under different conditions after use has begun as the imposed load places a large strain on certain sections of the chimney and the sections become misaligned and can allow the escape of exhaust fumes into the building. Also, if opposing flanges from two abutting chimney sections do not properly align the required seal is not formed and fire or exhaust hazards can occur.

With this background in mind the present invention was developed and one of its objectives is to provide a prefabricated multi-wall chimney section which can be easily assembled on-site by unskilled workmen using ordinary tools.

It is another objective of the present invention to provide a fastening means for sealing multiple wall chimney sections which are efficient and easy to handle and position in place.

It is still another objective of the present invention to provide a prefabricated multi-wall chimney section having an inner tube of stainless steel with an end flange also of stainless steel.

It is another objective of the invention to provide a chimney joint which is easy to assemble using ordinary tools and which meets all building and safety codes.

It is still another objective of the present invention to provide a multi-wall chimney section having an end flange with a rectangularly-shaped cross-section.

Other objectives and advantages of the present invention will be demonstrated in more detail below.

SUMMARY OF THE INVENTION AND DESCRIPTION OF THE PREFERRED EMBODIMENT

The invention herein comprises a prefabricated multi-wall chimney which is constructed from concentric tubes. The inner tube contains an end flange at each end which is rectangularly-shaped in cross-section and which abutts against and is joined to the inner tube of the adjoining section by a containment band which is adjustably tightened to hold the end flanges of the inner tubes in rigid engagement. An outer tube member is joined to the inner tube by a series of flexible u-shaped connectors which provide a conduit for air or insulating material between the inner tube and the surrounding structural materials. The outer tube member is of a shorter length than the inner tubes and a fastener which includes a sealing band connects the adjoining outer tubes.

The preferred embodiment of the multi-wall section includes an inner tube which may be for example 36 inches in length is formed from stainless steel and includes a ¼ by ¼ inch rectangularly-shaped solid stainless steel flange that is welded to the end of each inner tube. This flange provides a flat mating surface which is perpendicular to the axis of the inner tube which is composed of 20 gauge stainless steel. Surrounding the inner tube is an outer tube formed from 24 gauge aluminized steel and is held in concentric alignemnt with said inner tube by a series of u-shaped flexible connector means which are welded to the outer wall of the inner tube and to the inner wall of the outer tube. The outer tube is 1½ inches less in length than the inner tube and is centered thereon. A third or outermost tube is joined to the second or outer tube with u-shaped connector means which are welded to the outer wall of the outer tube and to the inner wall of the outermost tube. The outermost tube has a length of 3 inches less than the inner tube and it is concentrically positioned around the inner tube. The outermost tube has a diameter of approximately 1 inch greater than the outer tube and each end of the outermost tube is reduced in diameter approximately its own thickness for receiving a sealing band of a fastener which is used to form a substantially air-tight connection between adjoining outermost tubes. The preferred fastening band is formed from 24 gauge aluminized steel and includes an inner sealing band having a width of approximately 2 inches. Centered above the first sealing band is a second sealing band of approximately 4 inches in width with z-shaped spacer means connecting the first and second sealing bands. A stainless steel containment band is utilized to rigidly join the end flanges of the inner tubes and the fastener is thereafter positioned on the outer and outermost tubes to form a chimney joint. Sheet metal screws are then utllized to hold the fastner to the outermost tubes.

DESCRIPTION OF THE DRAWINGS

FIG. 5 shows in cut-away fashion an overall view of an expansion joint;

FIG. 6 demonstrates in cross-sectional view the containment band means used in FIG. 5;

Figure 1:
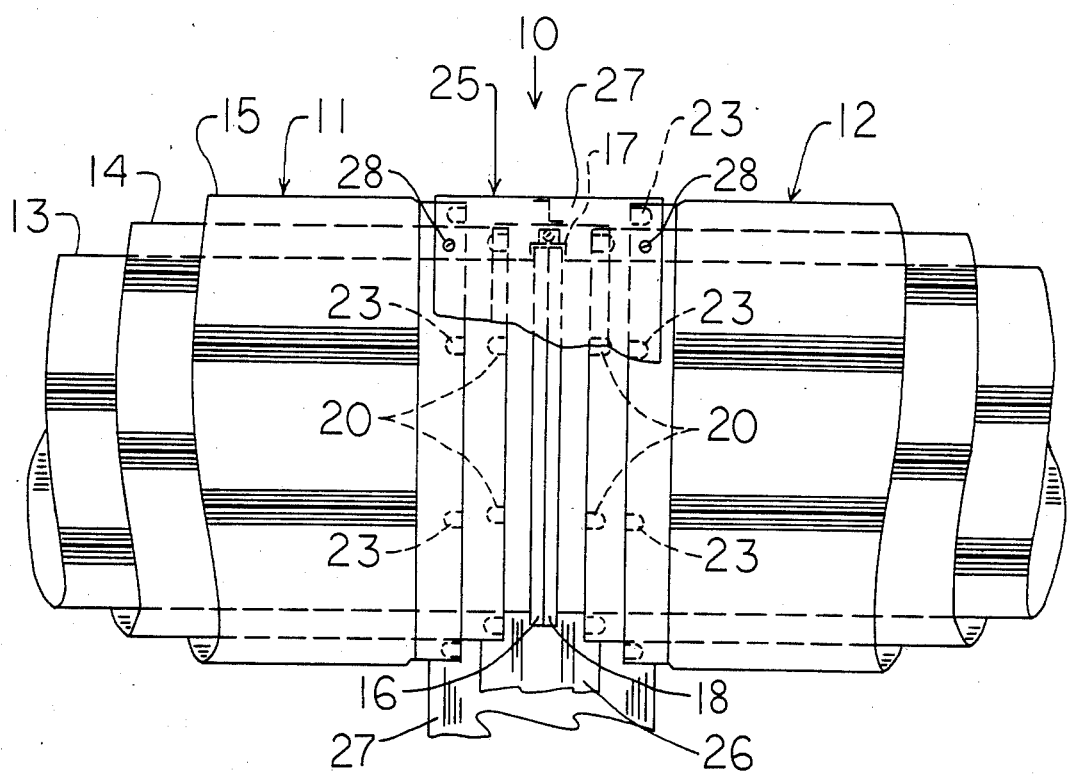
FIG. 1 demonstrates a chimney joint formed by coupling two prefabricated chimney sections.

For a more detailed description, turning to FIG. 1, a chimney joint 10 is formed by connecting a prefabricated multi-wall chimney section 11 which is longitudinally aligned with a second multi-wall chimney section 12, both sections 11 and 12 being shown in incomplete cut-away fashion in FIG. 1. Sections 11 and 12 may be for example 36 inches in length and comprise an inner tube member 13, an outer tube member 14 and an outermost tube member 15. Inner tube member 13 is cylindrically shaped from 20 gauge stainless steel and includes a rectangularly-shaped cross-section end flange 16 which provides a flat mating surface which is perpendicular to the longitudinal axis of inner tube member 13. Rectangularly-shaped cross-section end flange member 16 may be square in cross-section and typcially has a ¼×¼ inch dimension for tube members having a 36 inch or less diameter and has a ½×½ inch cross-sectional (length by width) for tube members having diameters greater than 36 inches. The end flange 16 extends radially outward from and about the entire periphery of the inner tube member 13. The rectangularly-shaped cross-sectional end flange member provides improved strength and durability for the assembled chimney and prevents the individual sections from collapsing under their own weight as certain chimney constructions require heights of 50 feet or more. As shown in chimney joints 10 of FIG. 1, containment band means 17 (see FIG. 2) engages end flange members 16 and 18 and holds them in rigid engagement. The containment band 17 is formed with opposed and spaced apart rims which engage opposite surfaces of the abutting end flanges 16, 18 almost completely around the circumference thereof. Screw operated adjoining means 19 can be tightened to insure a pressure tight fit of abutting chimney sections. Containment band means 17 is also constructed of stainless steel formed in a configuration complementary to the abutting end flange members 16 and 18 and is sized to provide convenience to on-site assembly and to insure a tight joint.

Figure 3:
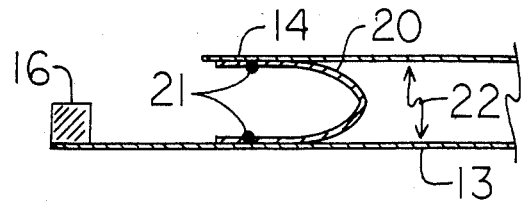
FIG. 3 demonstrates an enlarged view of a connector means.

Outer tube member 14 as shown in FIG. 1 is concentrically aligned with inner tube member 13 and may be composed of 24 gauge aluminized steel. The diameter of outer tube member 14 is typically 1 inch greater than tube member 13 so that an approximate ½ inch spacing between said tubes is maintained. The spacing is insured by u-shaped flexible connector means 20 as shown in FIG. 3 which may have spot welds 21 thereby affixing connecting means 20 to tube members 13 and 14 at circumferentially spaced intervals. As it would be understood tube member 13 is a conduit for hot exhaust gases from a boiler or the like and inner tube member 13 may reach many hundreds of degrees Fahrenheit during its course of operation. Consequently, inner tube member 13 may expand as much as 1 inch per 100 feet per 100° F. rise above ambient temperature along its longitudinal axis whereupon u-shaped connector means 20 due to its configuration, will allow inner tube member 13 to move relative to outer tube member 14 without damage or stress resulting. U-shaped connector means 20 will also allow radial movement between inner and outer tube members 13 and 14 as required during assembly or otherwise without damage. As would be further understood space 22 between inner and outer tube members 13 and 14 provides an insulating layer of air which protects wood or other structural materials from damage due to the high heat of inner tube member 13 as hot exhaust gases pass therethrough.

Outermost tube member 15 may also be composed of 24 gauge aluminized steel and is concentrically aligned with inner tube member 14 by connector means 23 which are similarly spot welded and shaped as are connector means 20. Connector means 23 allows outermost tube member 15 to maintain its concentric alignment with outer tube member 14 to provide yet another insulating air passageway between outer tube member 14 and outermost tube member 15 for additional insulation purposes which may be beneficial under certain conditions such as when inner tube member 13 conducts extremely hot exhaust gases or when the chimney sections are to be used near heat sensitive materials.

Figure 2:
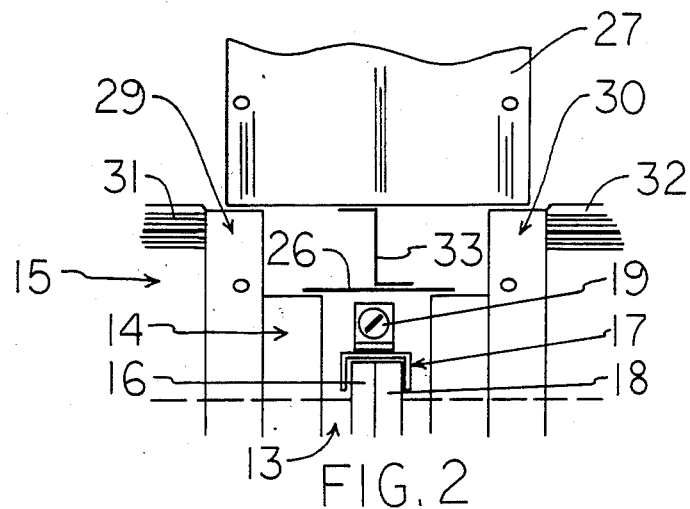
FIG. 2 shows an enlarged view of the containment band means engaging abutting end flange members.

FIG. 2 illustrates the relative length of tube members 13, 14 and 15 and as shown tube member 14 is typically 1½ inches less in length than inner tube member 13 whereas outermost tube member 15 is typically 3 inches less in length than inner tube member 13 or 1½ inches in length less than outer tube member 14. The differences in length allow for ease in joint forming and assembling and as further shown in FIG. 2 a sealing band means is used to couple adjoining outer and outermost tube members as also shown in FIG. 1.

Connector means 23 and connector means 20 are formed from stainless steel and may be formed from 1 inch wide strips of 18 gauge metal. It has been found that connector means 20 and 23 adequately provide support to the outer tube member 14 and outermost tube member 15 when equally spaced in numbers approximating ½ the diameter of the inside tube member. For example, if inside tube were 8 inches in diameter then four connector means would adequately space the outside tube member from the inside tube member As further demonstrated in FIG. 1, containment band means 17 engages end flange members 16 and 18 and sealing band means 25 is positioned around outer tube 14 and outermost tube 15 as would be understood sealing band means 25 does not provide the same rigidity of channel band means 17 but sealing band means 25 comprises a first narrow inner sealing band 26 and a second sealing band 27 which is spaced therefrom at a distance comparable to the respective gaps between outer tube member 14 and outermost tube member 15. Second sealing band 27 is somewhat wider than sealing band 26 to bridge the gap between tube ends 29 and 30 as shown in FIG. 2. Also shown in FIG. 2, tube ends 29 and 30 are of a slightly reduced diameter from main bodies 31 and 32 for receiving the second sealing band 27 to provide ease in attaching second sealing band 27 which may be secured for example with conventional sheet metal screws 28 as shown in FIG. 1. It has generally been found that no screws or other securing devices are required for first sealing band 26 to provide an adequate seal of the adjoining outer tube members.

Figure 4:
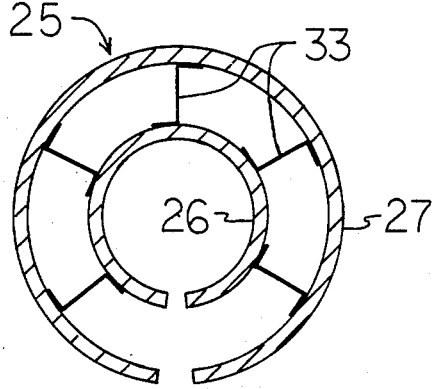
FIG. 4 demonstrates a fastening means removed from the chimney section.

Sealing band 25 as shown in FIG. 4 includes a series of z-shaped spacers 33 at circumferentially spaced apart intervals whereby first sealing bands 26 and second sealing bands 27 are welded or otherwise rigidly secured thereto at circumferentially spaced apart intervals. Sealing bands 26 and 27 are each provided with an opening. The opening of sealing band 26 is disposed adjaent the opening of sealing band 27.

Expansion chimney joint 40 which is different from chimney joint 10 of FIG. 1, is shown in cut-away fashion in FIG. 5. Expansion joint 40 comprises chimney section 41 and expansion section 42 which at the opposite end of section 42 (not shown in FIG. 5) is shown in FIG. 7, wherein both joints are shown.

It is noted that inner tube member 43 (heavy, dark lines of FIG. 5) has a smaller diameter than inner tube member 44 and therefore would be slideable therein if heated and longitudinally expanded. Expansion joint 40 includes containment band means 17 as used in chimney joint 10 of FIG. 1 and engages end flange member 16 of inner tube member 44 as shown in FIG. 6 with graphite sealing ring 45 and with tightener band 46. As would be understood from FIG. 6, expansion joint 40 allows inner tube member 43 to longitudinally expand inside inner tube member 44 and this arrangement is useful where elbow joints or turns are anticipated whereby normal tube "growth" cannot take place. Graphite sealing ring 45 forms a gas proof seal with end flange member 16 as shown in FIG. 6 and thus no exhaust gases are allowed to escape into the air spaces between the outer and outermost concentric tube members. As would be understood securing member 49 is tightenable and can be released as required for disassembly.

Figure 7:
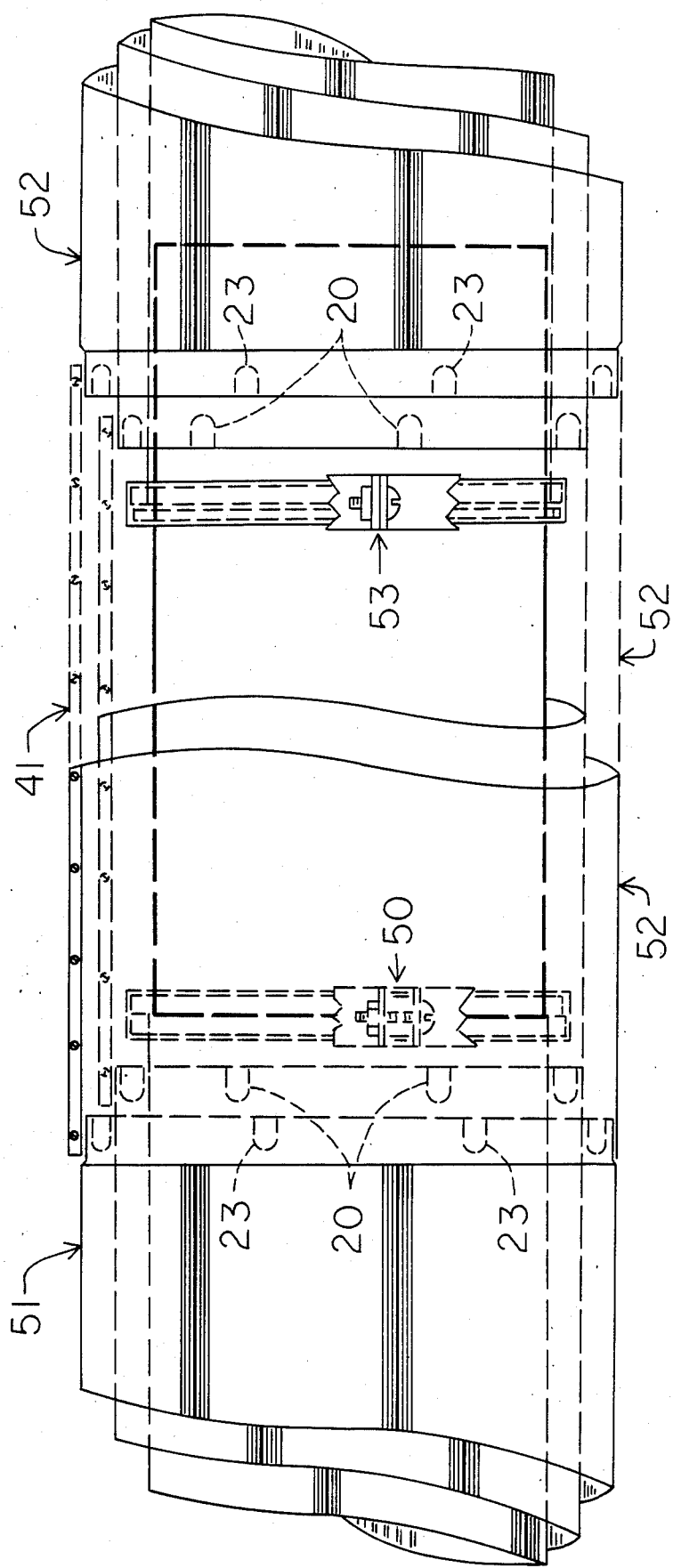
FIG. 7 demonstrates in schematic cut-away fashion two chimney joints, one of which allows for expansion.
Figure 8:
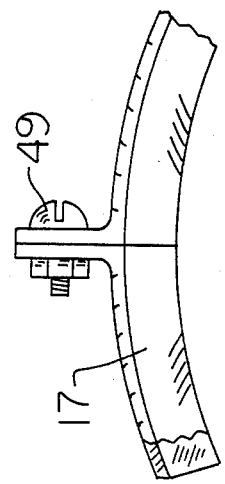
FIG. 8 demonstrates a partial perspective view of the containment band means as used with the expansion joint of FIG. 7.

FIG. 7 shows in schematic fashion joint 50 in which a typical chimney section of the invention 51 is connected as in joint 10 of FIG. 1 to a substantially similar end of expansion section 52 and joint 53 demonstrates an expansion joint as shown by joint 40 in FIG. 5 while FIG. 8 demonstrates an enlarged containment band means 17 with adjusting means 49 as discussed in relation to FIG. 6.

Various changes and modifications can be made to the examples herein shown and the illustrations and examples are for explanatory purposes and are not intended to limit the scope of the invention.

We claim:

1. A multi-wall chimney formed by a plurality of longitudinally aligned chimney sections joined together end-to-end, each chimney section comprising:
   an inner tube member having a flange at one end extending about the periphery of the inner tube and adapted to abut the flange of an adjoining chimney section;
   an outer tube member concentric with and spaced from said inner tube member;
   flexible connector means including a plurality of flexible connectors disposed at circumferentially spaced intervals outside said inner tube member and inside said outer tube member, each of said connectors having one end attached to said inner tube and an opposite end attached to said outer tube member for securing said outer tube member to said inner tube member, said connector means maintaining said outer tube member spaced from and concentric with said inner tube member while also permitting both radial and longitudinal movement between said inner tube member and said outer tube member; and
   said multi-wall chimney including a containment band in surrounding engagement with substantially the entire periphery of said abutting flanges.

2. A multi-wall chimney as claimed in claim 1 wherein said flange is substantially rectangular in cross-sectional shape.

3. A multi-wall chimney as claim in claim 2 wherein said flange is significantly greater in thickness than the gauge of the inner tube member.

4. A multi-wall chimney as claimed in claim 3 wherein said flange has a substantially square cross-section.

5. A multi-wall chimney as claimed in claim 2 wherein said flange is welded to said inner tube member.

6. The multi-wall chimney of claim 1 wherein said flexible connectors are substantially U-shaped.

7. A prefabricated multi-wall chimney comprising:
   a plurality of longitudinally aligned chimney sections, each of said sections including an inner tube having an end flange substantially rectangular in cross section with a thickness significantly greater than the gauge of said inner tube, an outer tube concentric with said inner tube, a plurality of substantially U-shaped connectors flexibly securing said outer tube to said inner tube at circumferentially spaced apart intervals, said inner tube longitudinally extending beyond the end of said outer tube;
   the end flange of one of said inner tubes abutting the end flange of another of said inner tubes providing a gap between the ends of the outer tubes of said aligned chimney sections adjacent said abutting end flanges;
   a containment band formed in a configuration complementary to said abutting end flanges and having opposed and spaced apart rim members engaging said abutting end flanges for rigidly joining said abutting end flanges together; and
   a sealing band for bridging said gap and sealing the ends of said outer tubes together.

8. The prefabricated multi-wall chimney of claim 7 further comprising screw operated means attached to said containment band and accessible through said gap for tightening said containment band around said abutting end flanges.

9. The prefabricated multi-wall chimney of claim 8 wherein each of said outer tubes includes a reduced section at its end disposed at said gap, said reduced sections for receiving said sealing band.

10. The prefabricated multi-wall chimney of claim 9 further including means for securing said sealing band within said reduced sections.

11. A prefabricated multi-wall chimney comprising:
    a plurality of longitudinally aligned chimney sections, each of said sections including an inner tube having an end flange with a thickness significantly greater than the gauge of said inner tube, an outer tube concentric with said inner tube, a first plurality of substantially U-shaped connectors flexibly securing said outer tube to said inner tube at circumferentially spaced intervals with said inner tube longitudinally extending beyond the end of said outer tube, an outermost tube concentric with said outer tube, a second plurality of substantially U-shaped connectors flexibly securing said outermost tube to said outer tube at circumferentially spaced intervals with said outer tube longitudinally extending beyond the end of said outermost tube, the end flange of one of said inner tubes abutting the end flange of another of said inner tubes, thereby providing a first gap between the ends of the outer tubes of said aligned chimney sections adjacent said abutting flanges and a second gap between the ends of the outermost tubes of said aligned chimney sections, said second gap wider than said first gap;
    containment band means engaging said abutting end flanges for holding said abutting end flanges in rigid engagement; and
    sealing band means for bridging said first gap and sealing the ends of said outer tubes together and for bridging said second gap and sealing the ends of said outermost tubes together.

12. The prefabricated multi-wall chimney of claim 11 wherein said abutting end flanges are substantially rectangular in cross-section and said containment band means is formed in a configuration complementary to said abutting end flanges.

13. The prefabricated multi-wall chimney of claim 11 wherein said sealing band means includes a first sealing band for encompassing the ends of said outer tubes at said first gap and a second sealing band for encompassing the ends of said outermost tubes at said second gap, first sealing band narrower than said second sealing band.

14. The prefabricated multi-wall chimney of claim 13 wherein said first sealing band is provided with an opening and said second sealing band is provided with an opening disposed adjacent the opening in said first sealing band.

15. A prefabricated multi-wall chimney of claim 14 wherein said sealing band means includes a plurality of substantially Z-shaped spacers circumferentially spaced apart, said spacers attached to both said first sealing band and said second sealing band for rigidly joining said second sealing band to said first sealing band at circumferentially spaced apart intervals.

16. The prefabricated multi-wall chimney of claim 15 wherein each of said ends of said outermost tubes includes a reduced sections at its end disposed at said second gap, said reduced section for receiving said second sealing band, said sealing band means includes fastening means for fastening said second sealing band to said outermost tube within said reduced section and maintaining both said first gap and said second gap sealed.

17. A prefabricated multi-wall chimney as claimed in claim 11 and said outermost tube having an end with a reduced section for receiving said sealing band means.

* * * * *